(12) United States Patent  
Mueller et al.

(10) Patent No.: US 8,940,207 B2  
(45) Date of Patent: Jan. 27, 2015

(54) PELLETIZING

(75) Inventors: Peter J. Mueller, Durham, CT (US); Richard H. Fetter, Bay City, MI (US); Robert A. Hewitt, Standish, MI (US); Jamie Allen Chomas, Essexville, MI (US); Jason Bradley Forgash, Bay City, MI (US)

(73) Assignee: Velcro Industries B.V., Willemstad (CW)

( * ) Notice: Subject to any disclaimer, the term of this patent is extended or adjusted under 35 U.S.C. 154(b) by 504 days.

(21) Appl. No.: 13/197,341

(22) Filed: Aug. 3, 2011

(65) Prior Publication Data

US 2012/0032006 A1 Feb. 9, 2012

Related U.S. Application Data

(60) Provisional application No. 61/370,297, filed on Aug. 3, 2010.

(51) Int. Cl.
*B29B 9/02* (2006.01)
*B29C 47/00* (2006.01)
*B29B 9/00* (2006.01)

(52) U.S. Cl.
CPC ......... *B29C 47/0011* (2013.01); *B29C 47/0066* (2013.01); *B29B 9/00* (2013.01); *Y10S 425/23* (2013.01); *Y10S 83/95* (2013.01)
USPC ........... 264/143; 264/140; 264/145; 264/148; 264/157; 264/160; 425/292; 425/307; 425/313; 425/316; 425/DIG. 230; 83/343; 83/349; 83/356.3; 83/436.6; 83/950; 241/277; 241/282.1

(58) Field of Classification Search
CPC .............. B29B 9/06; B29B 9/04; B29B 9/02; B29C 47/0066

USPC ......... 264/140, 142, 143, 145, 148, 157, 159, 264/160, 163; 425/292, 307, 308, 310, 313, 425/316, 337, DIG. 230; 83/349, 356.3, 83/436.1, 436.6, 674, 950, 343; 241/277, 241/280, 282.1
See application file for complete search history.

(56) References Cited

U.S. PATENT DOCUMENTS 3,128,514 A 4/1964 Parker et al.
3,494,006 A 2/1970 Brumlik
(Continued)

FOREIGN PATENT DOCUMENTS

EP 1810754 A1 7/2007
GB 2399496 A 9/2004
(Continued)

OTHER PUBLICATIONS

European Examiner Diebold; International Search Report and Written Opinion for Application No. PCT/US/2012/021662; dated Apr. 20, 2012; 11 pages.
(Continued)

*Primary Examiner* — Seyed Masoud Malekzadeh
(74) *Attorney, Agent, or Firm* — Fish & Richardson P.C.

(57) ABSTRACT

A continuous length of material of non-circular cross-section is pelletized to form discrete bits, by feeding the material to a cutting wheel with shaped cutters that form non-planar bits having non-circular axial projections and that are aligned with the material. The material is fed so as to maintain a rotational orientation with respect to the cutters, and so as to avoid buckling. Multiple banks of strands of material are severed simultaneously, thereby producing high volumes of shaped bits that are useful as filling and as filter material, and as friction-enhancing additives.

16 Claims, 13 Drawing Sheets

(56) References Cited

U.S. PATENT DOCUMENTS

| | | | |
|---|---|---|---|
| 4,243,181 A * | 1/1981 | Hench | 241/142 |
| 4,288,036 A | 9/1981 | Jubinville | |
| 4,530,649 A * | 7/1985 | Philipp et al. | 425/71 |
| 4,690,788 A * | 9/1987 | Yada et al. | 264/494 |
| 5,188,263 A | 2/1993 | Woods | |
| 5,313,864 A * | 5/1994 | Forgash et al. | 83/349 |
| 5,450,983 A | 9/1995 | Stern et al. | |
| 5,474,435 A * | 12/1995 | Hunke | 425/71 |
| 5,545,025 A * | 8/1996 | Tanaka | 425/315 |
| 5,628,465 A * | 5/1997 | Locker et al. | 241/34 |
| 5,628,947 A * | 5/1997 | Keilert | 264/143 |
| 5,634,601 A * | 6/1997 | Hild et al. | 241/224 |
| 5,749,129 A | 5/1998 | Murasaki et al. | |
| 5,888,554 A * | 3/1999 | Zollitsch et al. | 425/71 |
| 6,056,901 A | 5/2000 | Hamatani et al. | |
| 6,106,944 A | 8/2000 | Heikkila et al. | |
| 6,112,945 A | 9/2000 | Woods | |
| 6,247,389 B1 * | 6/2001 | Samuels et al. | 83/13 |
| 6,347,932 B1 * | 2/2002 | Kim | 425/71 |
| 6,352,184 B1 | 3/2002 | Stern et al. | |
| 6,666,352 B1 | 12/2003 | Woods | |
| 7,226,001 B1 | 6/2007 | Stern et al. | |
| 7,308,738 B2 | 12/2007 | Barvosa-Carter et al. | |
| 7,374,068 B2 | 5/2008 | Greer | |
| 7,393,201 B2 * | 7/2008 | Fetter et al. | 425/316 |
| 7,487,893 B1 | 2/2009 | Greer et al. | |
| 7,638,078 B2 * | 12/2009 | Sasabe et al. | 264/140 |
| 7,784,649 B2 | 8/2010 | Greer | |
| 8,082,637 B2 | 12/2011 | Tolan et al. | |
| 8,663,409 B2 * | 3/2014 | Mueller | 156/62.2 |
| 2002/0100355 A1 * | 8/2002 | Meidhof et al. | 83/674 |
| 2004/0025658 A1 * | 2/2004 | Fisher et al. | 83/663 |
| 2004/0261232 A1 | 12/2004 | Kurtz et al. | |
| 2005/0181171 A1 | 8/2005 | Ausen et al. | |
| 2005/0181352 A1 | 8/2005 | Shephard et al. | |
| 2005/0245410 A1 * | 11/2005 | Tezuka et al. | 510/175 |
| 2006/0016923 A1 * | 1/2006 | Lee | 241/294 |
| 2006/0230903 A1 * | 10/2006 | Fisher et al. | 83/663 |
| 2008/0021144 A1 | 1/2008 | Stahlberg et al. | |
| 2009/0068463 A1 | 3/2009 | Mochizuki et al. | |
| 2009/0130443 A1 | 5/2009 | Lustiger | |
| 2009/0188948 A1 | 7/2009 | Stern et al. | |
| 2012/0267033 A1 * | 10/2012 | Mueller | 156/66 |

FOREIGN PATENT DOCUMENTS

| | | |
|---|---|---|
| WO | WO0133989 A1 | 5/2001 |
| WO | WO2010050831 A1 | 5/2010 |

OTHER PUBLICATIONS

Texture Paint Spray Gun; Model 66103; Set Up and Operating Instructions; Central Pneumatic; Distributed exclusively by Harbor Freight Tools, 2008; 13 pages.

European Examiner Ross; International Search Report and Written Opinion for Application No. PCT/US/2011/046361; dated Dec. 18, 2011; 10 pages.

International Preliminary Report on Patentability and Written Opinion; Baharlou; Feb. 14, 2013; World Intellectual Property Organization (WIPO) (International Bureau of); PCT/US/2011/046361; 7 pages.

* cited by examiner

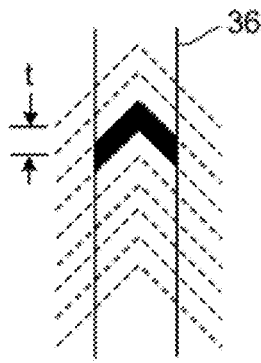 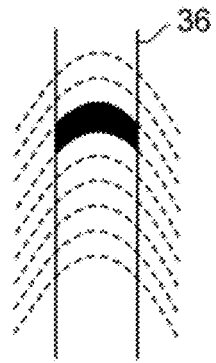 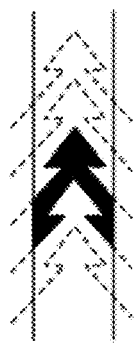 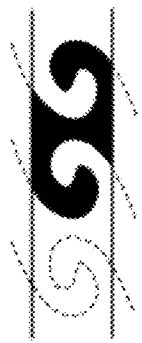
FIG. 3A  FIG. 3B  FIG. 3C  FIG. 3D
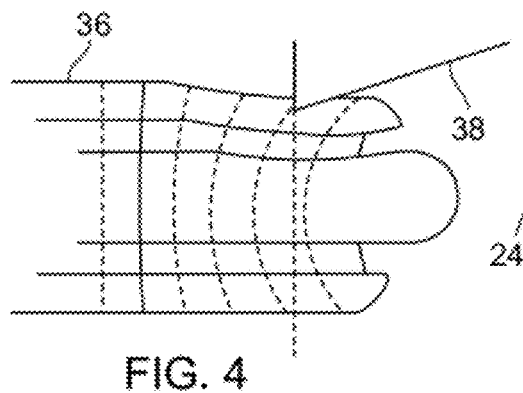 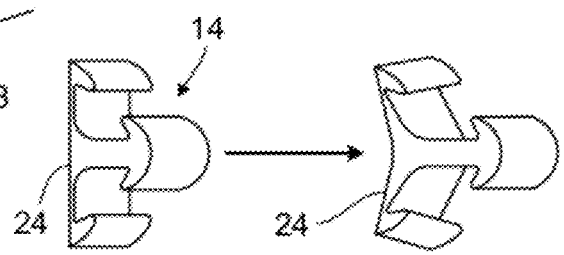
FIG. 4  FIG. 5
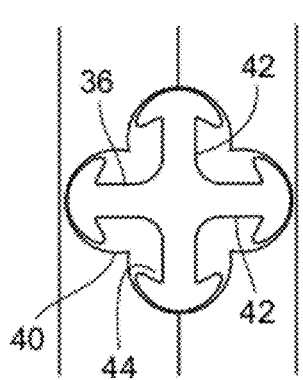 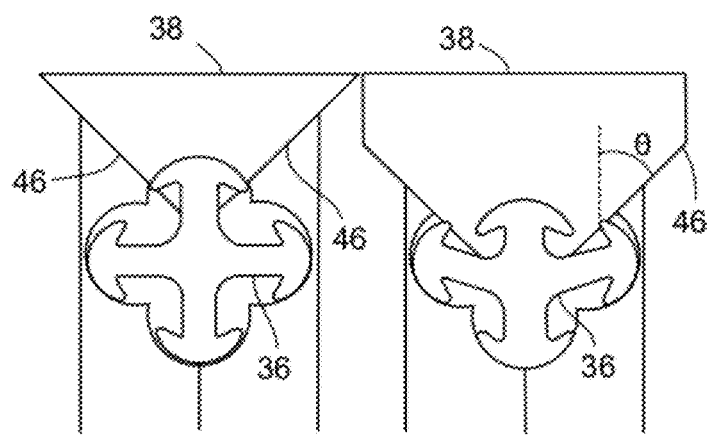
FIG. 6A  FIG. 6B  FIG. 6C

PELLETIZING

TECHNICAL FIELD

This invention relates to pelletizing, and more particularly to pelletizing shaped rails of material and to machines configured for such pelletizing and to the products generated thereby.

BACKGROUND

Continuous extrusions of material, such as plastic resin, are commonly pelletized by feeding the extrusions into a pelletizer in which a rotating cutting wheel severs the extrusions at fixed intervals to make discrete bits or pellets of the material for subsequent processing, such as for transport or feeding into a hopper for melting.

Improvements in pelletizing methods, and corresponding improvements in pelletizing machines, are sought, as are new and improved uses for the products of such methods.

SUMMARY

Some aspects of the invention feature a method of pelletizing a length of material to form discrete bits of material, by feeding a longitudinally continuous length of material through a guide aperture, supporting a distal region of the length of material against a support surface defining an edge beyond which a distal end of the length of material is fed downstream of the guide aperture, and, while continuing to feed the length of material through the guide aperture and over the edge of the support surface, severing the length of material at or beyond the distal edge at discrete intervals by a series of cutters disposed at spaced intervals about a cutting wheel, to form discrete and separate bits of the material.

According to one aspect of the invention, the length of material is of non-circular cross-section, the cutting wheel is maintained in alignment with the guide aperture, and the cutters are shaped such that severing the length of material forms cut surfaces that have perimeters of non-circular axial projection and non-planar cut profiles perpendicular to a direction in which the cutter moves through the length of material.

Some implementations also feature maintaining a rotational orientation of the non-circular cross-section of the length of material within the aperture. For example, the guide aperture may be at least partially defined by the support surface, the support surface defining a channel that is shaped to maintain a rotational orientation of the supported distal region of the length of material during severing by the cutters. The guide aperture may be defined by structure that fully encloses the length of material adjacent the edge of the support surface.

In some embodiments, the edge of the support surface is shaped in accordance with the cut profile, such that each cutter passes through a recess at the edge of the support surface after severing the material. For example, the cutters and the support surface recess may be of complementary shape. By "complementary shape" we mean that the cutters have a shape that fully nests within the support surface recess, such that there is essentially a constant gap between them at their closest position.

In some examples, the method also includes forming the recess at the edge of the support surface by removing support surface material with the cutters.

In some implementations, the cutters are all of identical shape, such that the formed bits all share a similar cut end shape.

In some cases, the guide aperture is at least partially defined by the support surface. For example, the guide aperture may be defined between the support surface and a groove surface of a bushing that is disposed upstream of the support surface edge.

In some embodiments, severing the material is performed while the material is compressed in a direction of cutting, such that in an uncompressed state in the severed bits opposite end surfaces are of different shape than as cut.

In some examples, each cut through the material forms a similar cut shape, such that both end surfaces of the severed bits are non-planar and of complementary topography. By "complementary topography" we mean that the opposite sides are configured such that two identical bits can be nested, with a side of one bit complementing an adjacent side of the other bit.

In some cases, the cutters each have a cutting profile that overlaps itself along a longitudinal axis of the length of material.

In some examples, the cutters each have a cutting profile that defines a smooth curve perpendicular to a longitudinal axis of the length of material. In some such examples, severing the material forms a concave material end surface.

In some embodiments, the length of material is encapsulated within a stabilization layer that is severed as the material is severed.

In certain useful examples, the length of material is of flexible resin.

Feeding the length of material preferably involves passing the length of material through a nip between two feed rolls, at least one of which feed rolls being driven to feed the length of material. Preferably the guide aperture extends downstream of the nip to the edge of the support surface, with the guide aperture defining an inner dimension less than twice a corresponding outer dimension of the length of material, thereby limiting buckling of the fed length of material. In some configurations the guide aperture is at least partially defined within a transfer tube that has an entrance positioned such that there remains at any point of time during the feeding and severing of the length of material an unsupported portion of the length of material between the feed rolls and the transfer tube that is of a length less than twice a maximum lateral dimension of the length of material.

In some embodiments, feeding the length of material comprises feeding the length of material along an alignment groove defined in a circumferential surface of one of the feed rolls. The alignment groove may be shaped to maintain a rotational orientation of the length of material in the nip.

Some examples of the method also feature lubricating an outer surface of the length of material upstream of severing the length of material.

In some applications, the length of material has a maximum lateral extent of less than about 3.0 millimeters, preferably in some cases less than about 1.2 millimeters.

In some configurations, multiple lengths of material are fed, supported and severed in parallel. For example, multiple lengths of material may be fed in multiple banks that are severed at different positions about the cutting wheel.

Another aspect of the invention features a pelletizing machine for pelletizing a continuous length of material. The machine has a pair of feed rolls arranged to form a feed nip between them, at least one of the feed rolls being driven so as to feed the length of material, a guide aperture positioned to receive the length of material downstream of the nip and configured to guide the fed length of material over a support surface to extend beyond an edge, and a cutting wheel carrying a series of cutters disposed at spaced intervals about the cutting wheel. The cutting wheel is configured for rotation with respect to the guide aperture so as to bring the cutters adjacent the edge in succession, to sever a distal end portion of the length of material extending beyond the edge, to form discrete and separate bits of the material. Preferably, the guide aperture is of non-circular cross-section so as to maintain a rotational orientation of the length of material approaching the edge, and the cutters are shaped so as to form non-planar cut profiles through the length of material.

In some cases, the guide aperture is at least partially defined by the support surface, the support surface defining a channel that is shaped to maintain the rotational orientation of the length of material passing over the edge. The guide aperture may be fully enclosed by structure adjacent the edge of the support surface.

In some examples, the edge of the support surface is shaped in accordance with the cut profile, such that each cutter passes through a recess at the edge of the support surface. For example, the cutters and the support surface recess may be of complementary shape, as discussed above.

The cutters, in some instances, are all of identical shape.

In some embodiments, the guide aperture is at least partially defined by the support surface. For example, the guide aperture may be defined between the support surface and a groove surface of a bushing that is disposed upstream of the support surface edge.

In some cases, the cutters each have a cutting profile that defines a smooth curve perpendicular to a longitudinal axis of the guide aperture at the edge.

In some configurations, the guide aperture is at least partially defined within a transfer tube that has an entrance positioned a distance from the nip that is less than twice a maximum lateral dimension of the transfer tube entrance.

In some embodiments, at least one of the feed rolls defines a circumferential alignment groove positioned to receive the length of material in the nip. The alignment groove may be shaped to maintain a rotational orientation of the length of material in the nip.

In some useful examples, the guide aperture has a maximum lateral extent of less than about 3.0 millimeters, preferably less than about 1.2 millimeters.

Some examples of the machine have multiple sets of feed rolls defining multiple nips configured to feed multiple rails to the cutting wheel at different positions about the cutting wheel.

In some embodiments, the cutting wheel carries multiple series of cutters spaced apart along an axis of the cutting wheel and arranged in alignment with corresponding guide apertures, for severing multiple lengths of material fed in parallel through the guide apertures.

Other aspects of the invention feature pelletized bits of a shape formed by the process and machine described herein. This improved process and machine can produce bits useful for many purposes, including as filter and fill material, or to provide frictional or anti-skid properties when adhered to a surface.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A-3D illustrate four different cut configurations for cutting bits from a rail.

FIG. 4 illustrates rail deformation during cutting, as viewed from the side.

FIG. 5 shows bit curvature induced by rail deformation during cutting.

FIGS. 6A-6C sequentially show a process of cutting through a rail.

Like reference symbols in the various drawings indicate like elements.

DETAILED DESCRIPTION

Figure 1:
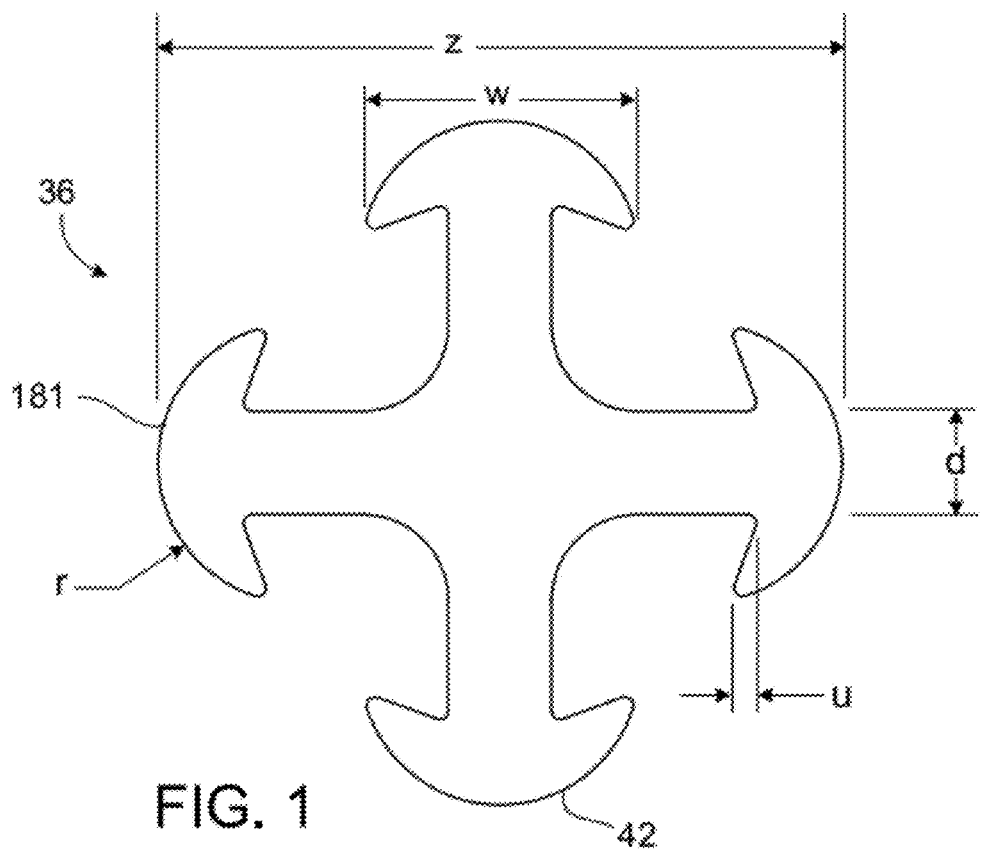
FIG. 1 is an end view of a rail to be pelletized, showing its cross-section.

FIG. 1 shows a cross-section of a shaped, continuous rail 36 that may be pelletized to form discrete, shaped bits. The rail has four longitudinal ribs 42, each of which ends at a head 181 that has an overall width 'w' of about 0.4 millimeter and a curved outer surface of radius 'r' of about 0.2 millimeter, overhanging the neck of the rib, the neck having a width 'd' of about 0.15 millimeter. The edges of each head extend back toward the bit a distance 'u' of about 0.033 millimeter. The maximum lateral dimension 'z' of the rail, measured from outer head surfaces, is about 1.02 millimeter.

Figure 2:
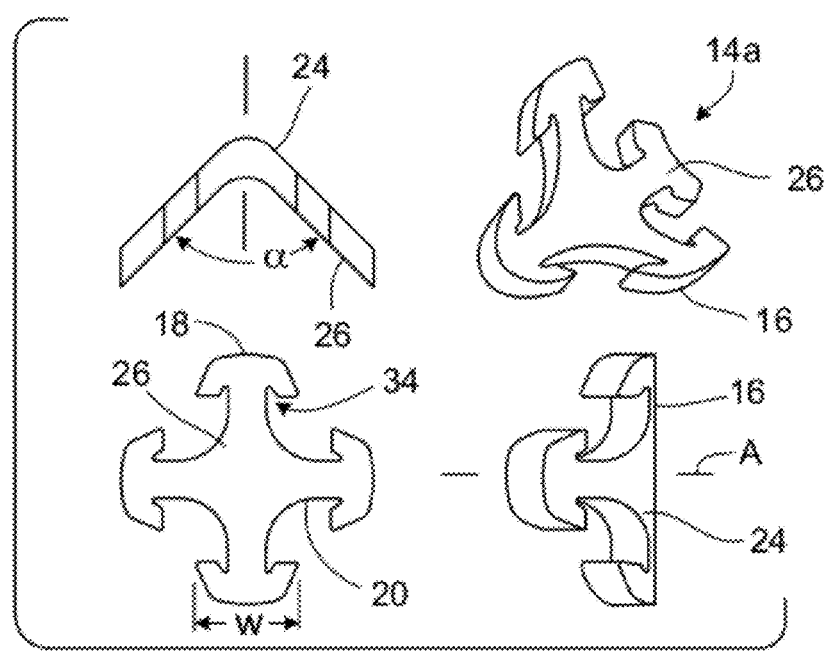
FIG. 2 shows three orthogonal and one perspective view of a pelletized bit.

Referring next to FIG. 2, a bit 14a severed from a similarly shaped rail (but with slightly different rib head geometry) has two non-planar opposite side surfaces 24 and 26 of complementary topography, such that two identical such bits will nest, with an opposite side surface 24 of one bit nestled against an opposite side surface 26 of the other bit. The other surfaces of bit 14a are all surfaces 28 that extend between the opposite side surfaces 24 and 26 and parallel to bit axis 'A'. In other words, for this particular bit design (and for some others discussed below), the volume of bit 14a may be formed by sweeping one of its non-planar opposite side surfaces 24 or 26 along the bit axis 'A' a distance 't' equal to the bit thickness.

Side surface 26 of bit 14a may be said to be concave, and side surface 24 convex. It will be appreciated that not all portions of either opposite side surface 24 or 26 are curved, however, as can be seen in the upper left quadrant of FIG. 2, which illustrates that in one side view, bit 14a can be said to be L-shaped, such that two of the projections 16 have generally planar sides, while the other two projections have curved sides. The root of each projection features a generous fillet with a radius of about 0.13 millimeter, to help avoid projection root fracturing. The projection heads each have an overall width 'w', measured from tip to tip, of about 0.38 millimeter. While the bit 14a of FIG. 2 is shown to define an included angle α on its concave side of about 90 degrees, it has been found that in many cases the severed bits tend to 'open up' after cutting, such that if an included angle of 90 degrees is desired, the rail may have to be severed at a corresponding angle of less than 90 degrees.

If bit 14a of FIG. 2 were fashioned as shown, but with its opposite side surfaces 24 and 26 planar and parallel, such a bit would tend to self-orient when falling against a horizontal surface with one or the other of its planar sides lying flat on the surface, with none of the projections extending upward. The shape of bit 14a, as with other bit shapes discussed below, is such that the bit will tend to self-orient with at least one projection raised. In some cases, as discussed below, only one of the opposite side surfaces is non-planar and the other of the opposite side surfaces is planar, with the non-planar opposite side surface defining a projection that extends away from the planar opposite side surface, such that if the bit falls with its planar side surface lying flat the projection extending from the non-planar side surface will extend upward.

Bits of non-planar opposite side surfaces of complementary topography may be formed by cutting the bits from a shaped rail with a series of identical cuts, each cut simultaneously forming an opposite side surface 24 of one bit and an opposite side surface 26 of another bit. Examples of such cut sequences are shown in FIGS. 3A-3D, in each of which the elongated rail 36 from which the bits are cut extends vertically, each cut made perpendicular to the elongated rail is shown as a dashed line, and one bit is formed between each adjacent pair of cuts. Because the cuts are identical, the cuts in each sequence may be made by a single cutter cycled through the rail as the rail is advanced along its longitudinal axis a distance 't' between each cut, such that 't' also corresponds to the thickness of the severed bit. FIG. 3A illustrates cutting with a cutter having a pointed cutting profile, the apex of which is aligned with the center of the rail. FIG. 35B illustrates cutting with a cutter having a cutting profile that defines a smooth curve perpendicular to a longitudinal axis of the rail, such that each cut forms a concave rail end surface. FIGS. 3C and 3D illustrate cutting profiles that overlap themselves along the longitudinal axis of the rail, such as to form more complex projection head shapes.

The rail shape and material resiliency may be chosen such that the process of cutting bits from the rail imparts further geometric properties. For example, FIG. 4 is a side view of a shaped rail undergoing a series of vertical cuts. The bold dashed line represents the path of the apex of a cutter 38 shaped as in the cut sequence of FIGS. 3A-3D, moving from top to bottom in FIG. 4. As the cutter enters the material, force from the cutter compresses the material of the rail, which remains compressed during cutting. The lighter dashed lines of FIG. 4 illustrate the flexure of the rail 36 due to the cutter-induced compression. Because the rail material is resilient, after a bit is severed from the rail its severed surface 24 obtains a curvature perpendicular to the path of the cut, due to relaxing of the compressed bit material, as illustrated in FIG. 5. Thus, curvature in one plane can be provided by cutter shape, while curvature in a perpendicular plane can be provided by compression during cutting, and curvature in yet another perpendicular plane can be provided by rail shape. In this manner, bit geometry may be altered in essentially any orthogonal direction.

Furthermore, the resulting geometry of each cut can be modified by adjusting the unsupported length of rail extending between the end of its support surface and the cutter. For example, spacing the cutter wheel so as to engage the rail beyond the end of its support will cause the unsupported length of rail to be resiliently deflected during cutting by bending forces induced by the cutting, such that, after the cutting, the unsupported length of rail returns to a position, prior to a subsequent cut, in which an edge of the rail corresponding to an exit point of the cutting extends farther in a longitudinal direction than an edge of the rail corresponding to an entrance point of the cutting. However, for many applications it may be preferable to reduce or eliminate any unsupported length of rail during cutting.

FIGS. 6A-6C sequentially illustrate progression of a cutter 38 through a shaped, extruded rail 36 supported within a groove 40 defined between two plates. FIG. 6A shows the relaxed shape of rail 36, shaped with four longitudinal ribs 42 so as to form bits having four perpendicular projections as shown in FIG. 2, each rib defining undercuts 44 that correspond to the crooks of the bit heads. Groove 40 is shaped and sized to allow rail 36 to be advanced along the groove between successive cuts, but with minimal clearance at the rib heads and so as to disallow rotation of the rail during cutting. FIG. 6B shows the cutter 38, in this case a pointed cutter with a solid cutting edge having an apex aligned with the center of the rail, advanced almost completely through the uppermost rib 42, which is in a state of vertical compression. The shape of cutter 38 shown in this sequence results in much of the rail material being sliced by the acutely-angled cutting edges 46 on either side of the cutter, without inducing a net lateral load on the rail during cutting. In end view, cutting edges 46 each form an acute cutting angle θ with respect to the direction of cutting, each cutting edge 46 shearing through the rail toward a lateral rail edge as the cutter 38 advances through the rail 36. FIG. 6C shows the cutter advanced nearly completely through the center web of the rail, with the material of the severed upper rail rib remaining compressed due to shear loads against the face of the cutter and due to the very rapid speed of cutting. The vertical compression of the rail also tends to compress the lower rail rib and distort the side ribs, as shown. As the cutting edge of cutter 38 progresses completely through rail 36 at discrete intervals along the rail axis (extending out of the plane of the figure), discrete and separate bits are formed, with the cutting forming the opposite side surfaces of each bit, the projections of each bit formed of severed rib segments of the rail. A high tolerance for strain before yield is considered a desirable property for rail materials.

Figure 7:
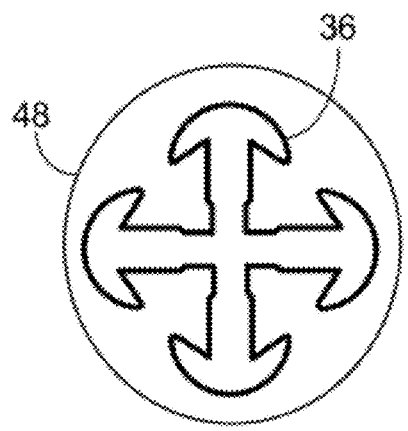
FIG. 7 is an end view of a rail encased in a stabilization material.

Rail deformation during cutting can be reduced, if desired, by forming a stabilization layer around the ribs prior to cutting. FIG. 7 shows a rail cross-section in which the rail 36 is encapsulated in a stabilization material 48. Examples of a rail stabilization material include lower melting point polymers or starch that can be melted or washed from the severed bits to expose the projection-defining surfaces of the bit. Cutting through the stabilized rail 36 includes cutting through the stabilization layer 48.

Figure 8:
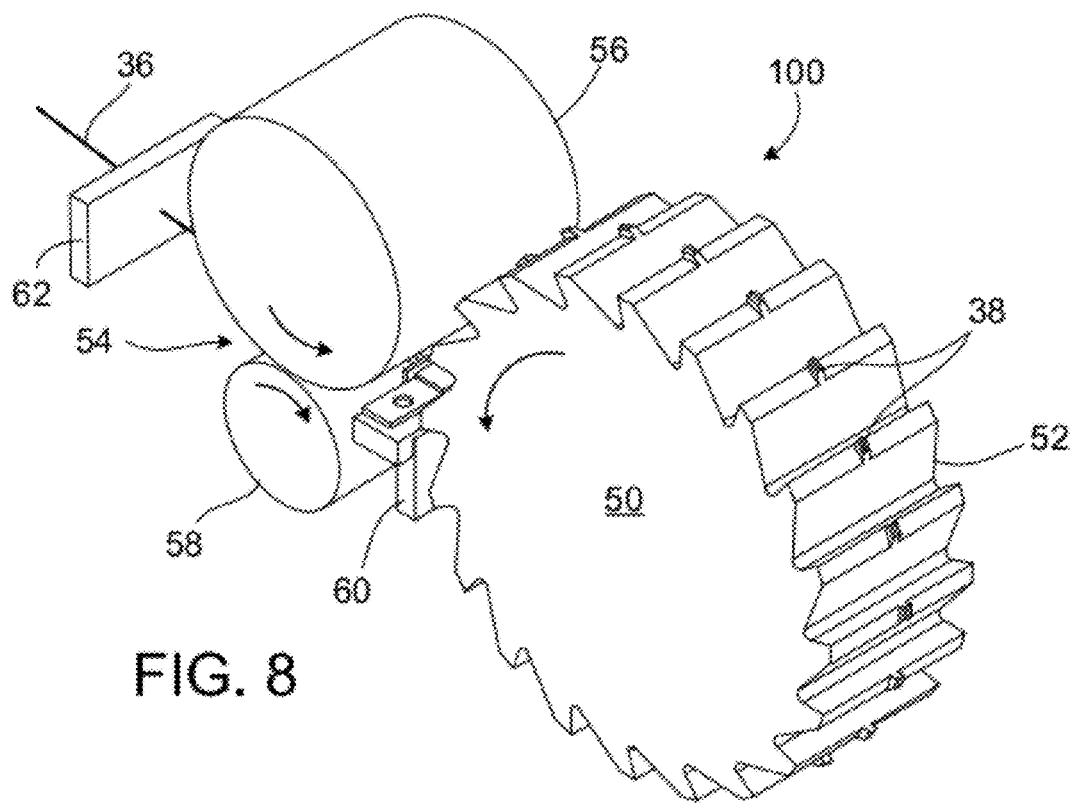
FIG. 8 is a perspective view of portions of a machine for cutting bits from a continuous extrusion.

Referring to FIG. 8, a toothed cutter wheel 50 has a series of teeth 52 about its periphery, and each tooth is shaped to form a cutter 38 at a distal end of a protrusion extending from the tooth. The radius of the path traced by cutter 38 is sufficiently large, as compared to the vertical dimension of the rail, that the path of the cutter through the rail can be said to be substantially linear. The extruded rail 36 is fed toward cutter wheel 50 through a nip 54 between a pair of counter-rotating feed rolls, including an upper feed roll 56 and a lower feed roll 58. The rail is supported during cutting by a bed knife 60.

Figure 8A:
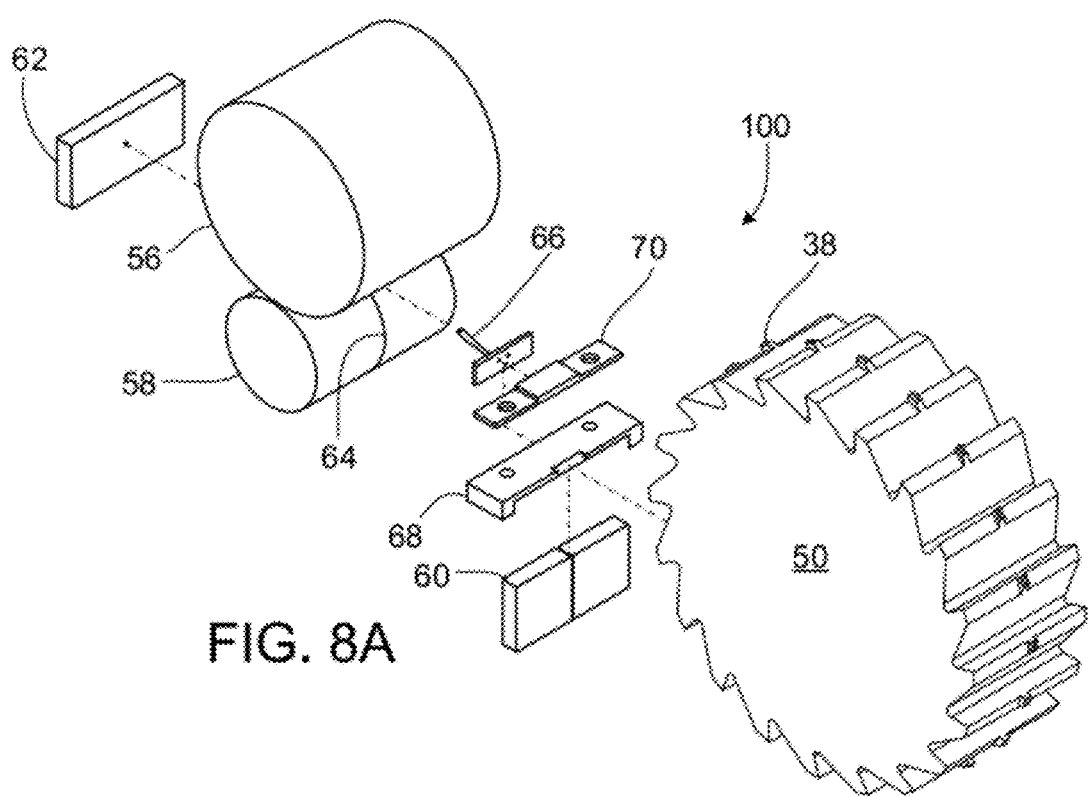
FIG. 8A is an exploded view of the machine components of FIG. 8.
Figure 9:
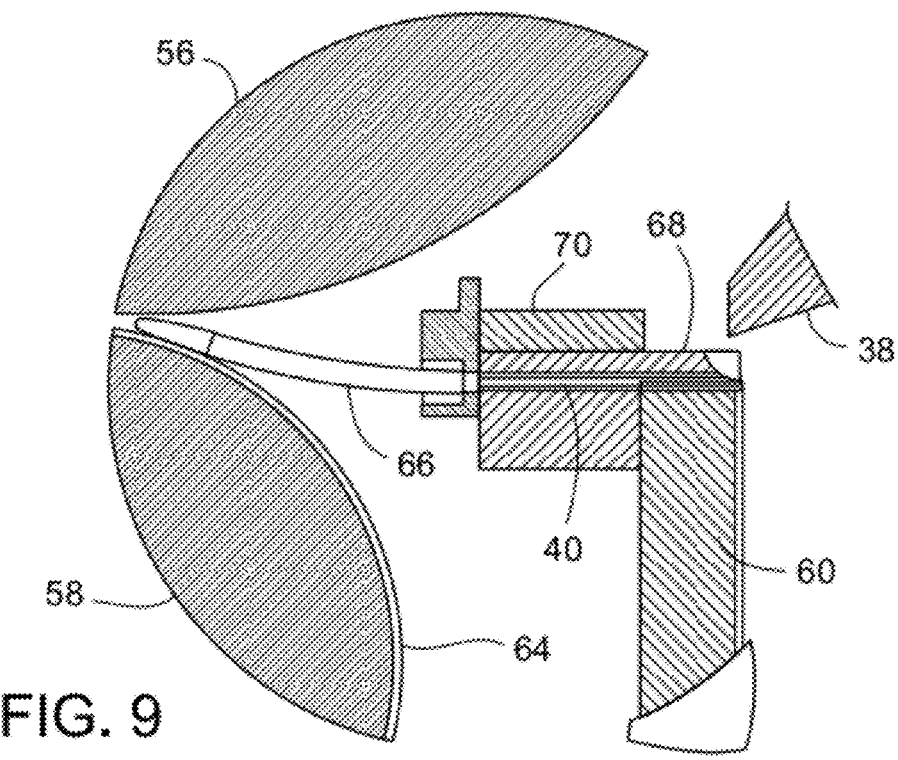
FIG. 9 is a cross-sectional view, taken through the extrusion travel path from the feed nip to the cutting plane.
Figure 10:
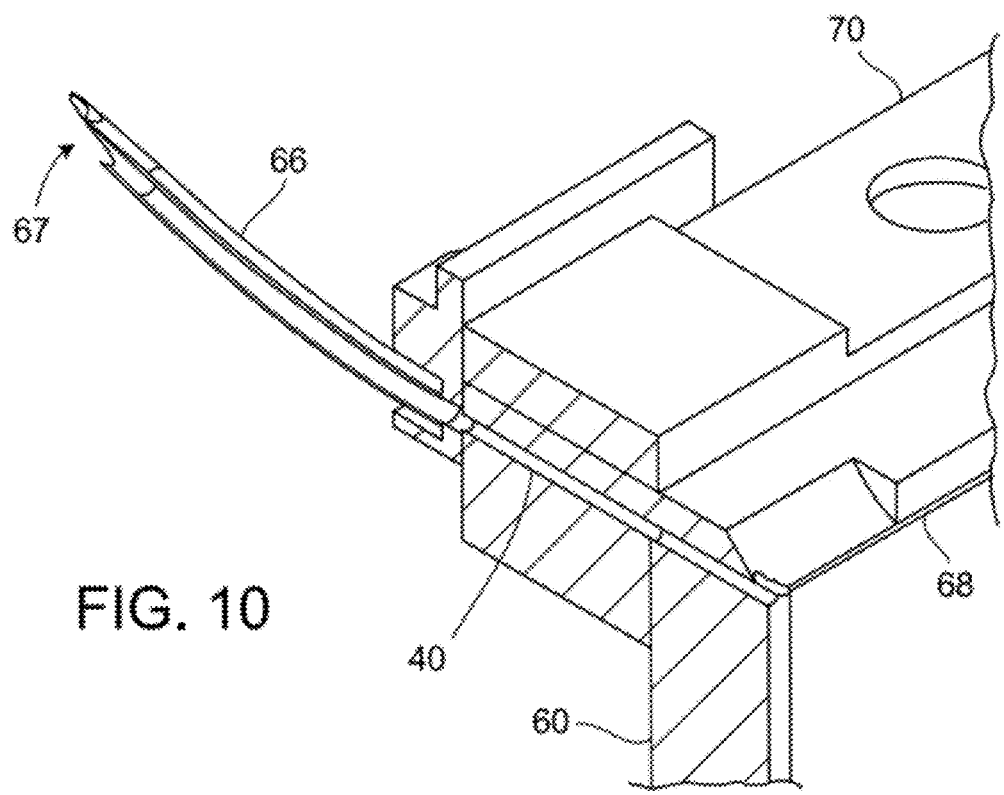
FIG. 10 is a sectioned view showing the rail support structure.

Referring also to FIG. 8A, lateral alignment and rotational orientation of the rail is maintained by a pre-alignment bushing 62, a groove 64 defined about the circumference of lower feed roll 58, a hollow transfer tube 66 through which the rail travels on its way to a rail guide groove defined between the upper surface of bed knife 60 and a lower surface of bushing 68. In some instances, upper feed roll 56 also defines a groove, aligned with groove 64 in the lower feed roll, for accommodating the rail. The aperture in bushing 62 is sized so as to halt the progress of the rail if any extrusion defects are encountered that would not readily pass through the rest of the machine, and may be tapered at its entrance to facilitate feeding a new rail into the machine while running Although illustrated as a flat surface, the exit side of bushing 62 may be shaped so as to place the bushing in very close proximity to both feed rolls, such that the end of a new rail fed into the bushing will be directed into any groove of the feed rolls while they are rotating. A transfer tube attachment bracket 70 holds the transfer tube securely in place with respect to the bed knife. The lower feed roll 58 is a relatively rigid roll, with an outer surface of stainless steel, while the upper feed roll 56 has a compliant outer surface, such as of Hypalon® (formerly available from DuPont) or similar material, that engages the rail and feeds it into the transfer tube 66, which, as shown in FIG. 9, extends as far as practical into the nip between the two rolls, so as to prevent buckling of the rail by the feed action of the rolls, which continues throughout the cutting process, even while the cutters temporarily prevent the advance of the end of the rail. Preferably, the transfer tube has an entrance positioned such that any unsupported portion of the rail between the feed rolls and the transfer tube is of a length less than twice a maximum lateral dimension of the rail. As shown in FIG. 10, the entrance end 67 of the tube is shaped with relief both top and bottom to accommodate the feed rolls, such that the unsupported length of rail is roughly the same or less than the rail width. Although groove 40 is shown as below the elevation of the nip between the feed rolls, in some cases it is aligned vertically with the nip, such that the rail does not alter its direction or undergo any bending as it passes from feed nip to cutter wheel.

As an example of workable dimensions for processing a rail of thermoplastic resin having a maximum lateral dimension of 1.02 millimeters, transfer tube 66 has an inner diameter of 1.27 millimeters, and the groove 40 that rotationally aligns and supports the rail at the upper surface of bed knife 60 has a lateral dimension of 1.12 millimeters (i.e., a working nominal clearance of only about 0.05 millimeters on either side of the rail). Bed knife 60 is also grooved on its face facing the cutter wheel, as shown in FIGS. 9 and 10, to provide clearance for the cutters and to assist in the alignment of the equipment. As shown in FIG. 10, the bushing 68 is relieved at the exit of groove 40, such that the upper portion of the rail is exposed while the underside of the rail remains supported by the shaped upper surface of the bed knife forming the lower portion of groove 40. The surfaces against which the rail slides may all be plated, polished or otherwise treated to avoid or reduce friction coefficients as against the rail material. Furthermore, movement of the rail along its path may be assisted by flowing a rail carrier, such as air or water, along the path with the rail. Such a rail carrier may be, for example, a lubricant selected to facilitate severing or prolong cutter life, and may be caused to flow at such velocity that it helps to propel the rail forward toward the cutting wheel. Alternatively, the rail may be lubricated by a coating applied to the rail, or by a liquid lubricant spray or bath. These rail feed surfaces may also be cooled or heated, to decrease or increase the temperature of the rail prior to cutting.

Bed knife 60 may be formed of a much harder, wear-resistant material than cutters 38 of the cutter wheel, such that final shaping of the cutters may be performed by running the spinning cutter wheel into contact with the bed knife, or adjusting the bed knife toward the cutter wheel, the bed knife groove forming a complementary shape to the cutters. The cutter wheel may be left in such a position with respect to the bed knife during rail cutting, such that rail cutting is done with essentially a zero-clearance or line-to-line positioning of cutters and bed knife. Similarly, to accommodate cutter wear during use, the position of the cutter wheel may be adjusted toward the harder bed knife to "re-form" the cutter surfaces and prolong the useful life of the cutters. The bed knife may be formed of carbide, for example, and the cutters of 303 stainless steel. The channel on the upper surface of the carbide bed knife that forms the lower part of groove 40, and the groove on the front face of the bed knife, may both be formed by a wire-EDM process.

The cutter wheel is positioned vertically with respect to the exit of groove 40 such that the rail engages the cutter at an elevation slightly below the rotational axis of the cutter wheel. This causes the rail to be offset very slightly from the rotational axis of the wheel in a forward sense with respect to the direction of rotation, such that the cutters enter and exit the rail at slightly different axial positions along the rail and the rail is maintained under some tension during each cut. Preferably, however, the cutters move along a circular path that has a radius at least 40 times a distance that each cutter cuts through the rail, such that this difference in axial variation during each cut is very small.

In one example, a six inch (15 centimeter) diameter cutter wheel 50 was rotated at 3000 rpm, achieving an effective linear cutting speed of 2,400 centimeters per second through the rail. With 32 cutters about the cutter wheel, this achieves a production speed of about 1,600 bits per second (bps) from a single rail. Achieving a bit thickness of 0.3 millimeter at such speed requires advancing the rail at a rate of about 49 centimeters per second. A similar process with only 4 cutters about the wheel would require a rail advance rate of only about 6 centimeters per second (12 feet per minute).

Figure 11:
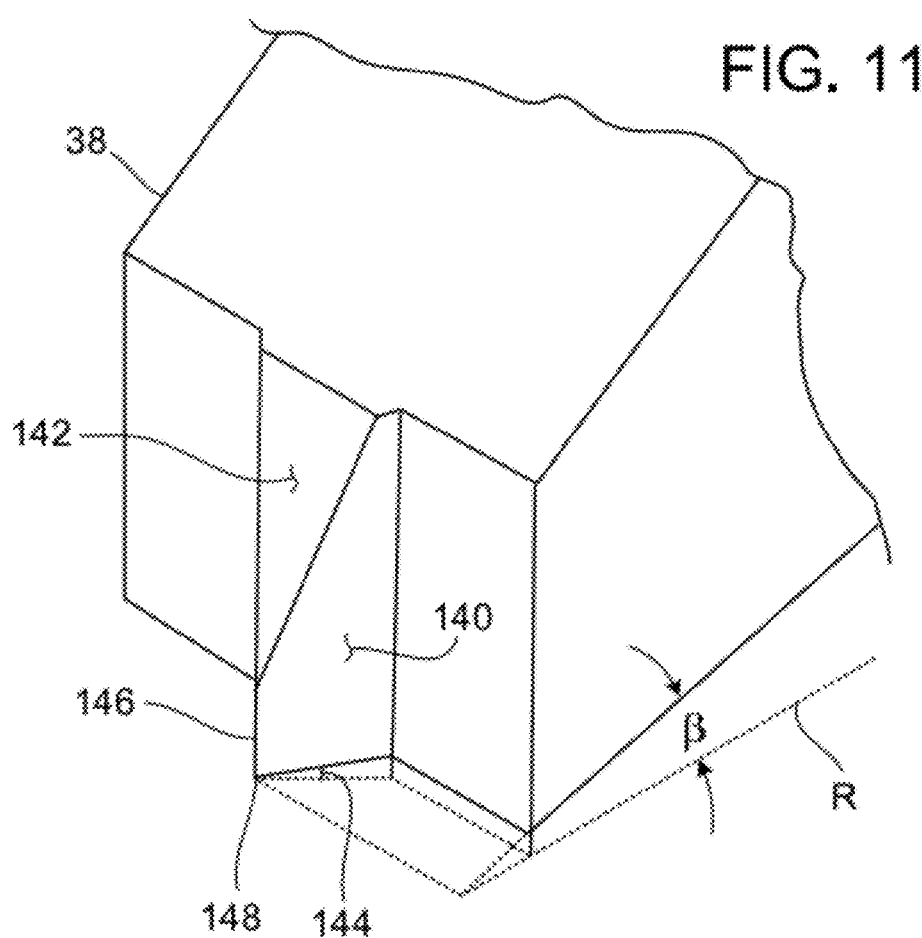
FIG. 11 is a perspective view of a distal end of a cutter.
Figure 12:
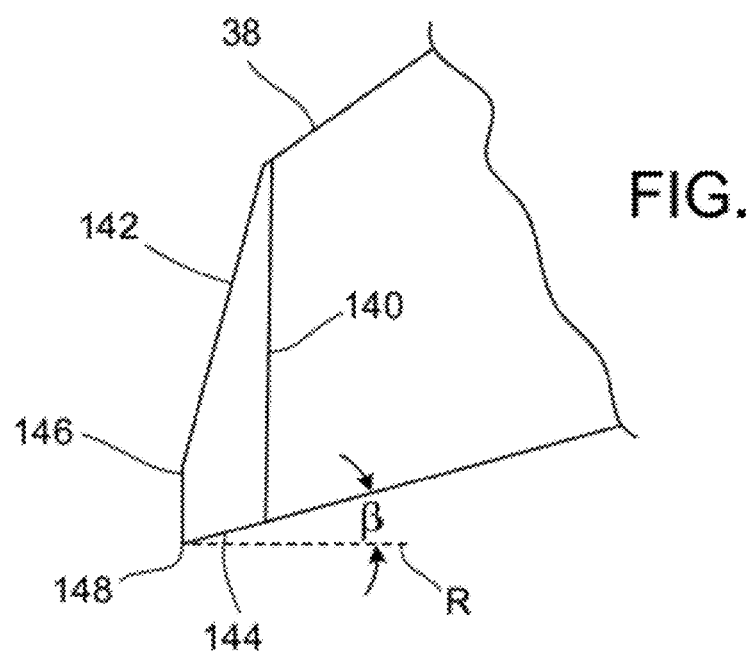
FIG. 12 is a side view of the cutter of FIG. 11.

FIGS. 11 and 12 show the detail of a cutter 38, which is formed to have a pointed projection 140 that engages and severs the rail. The trailing portion of projection 140 has a wedge-shaped relief 142, and the leading edge 144 of the projection defines a rake angle β with a radius R of the cutting wheel, such that the point 148 defined at the intersection of the radially distal edge 146 of the projection and the leading edge 144 of the projection leads the cutter in its rotation. Distal edge 146 is shown essentially perpendicular to the cutting wheel radius from point 148 to the beginning of relief 142. Rake angles of about 20 to 25 degrees have been found to be appropriate with polyester rails. While this cutter 38 is shaped with an outwardly-directed projection for forming concave cuts in the rail, cutting may also be performed by a cutter defining a recess, such that the rail is first engaged on either lateral side by the advancing edges of the walls defining the recess. Such a cutter shape may help to trap the rail end as it is severed, forming convex surfaces on the exposed rail end.

Figures 13, 14:
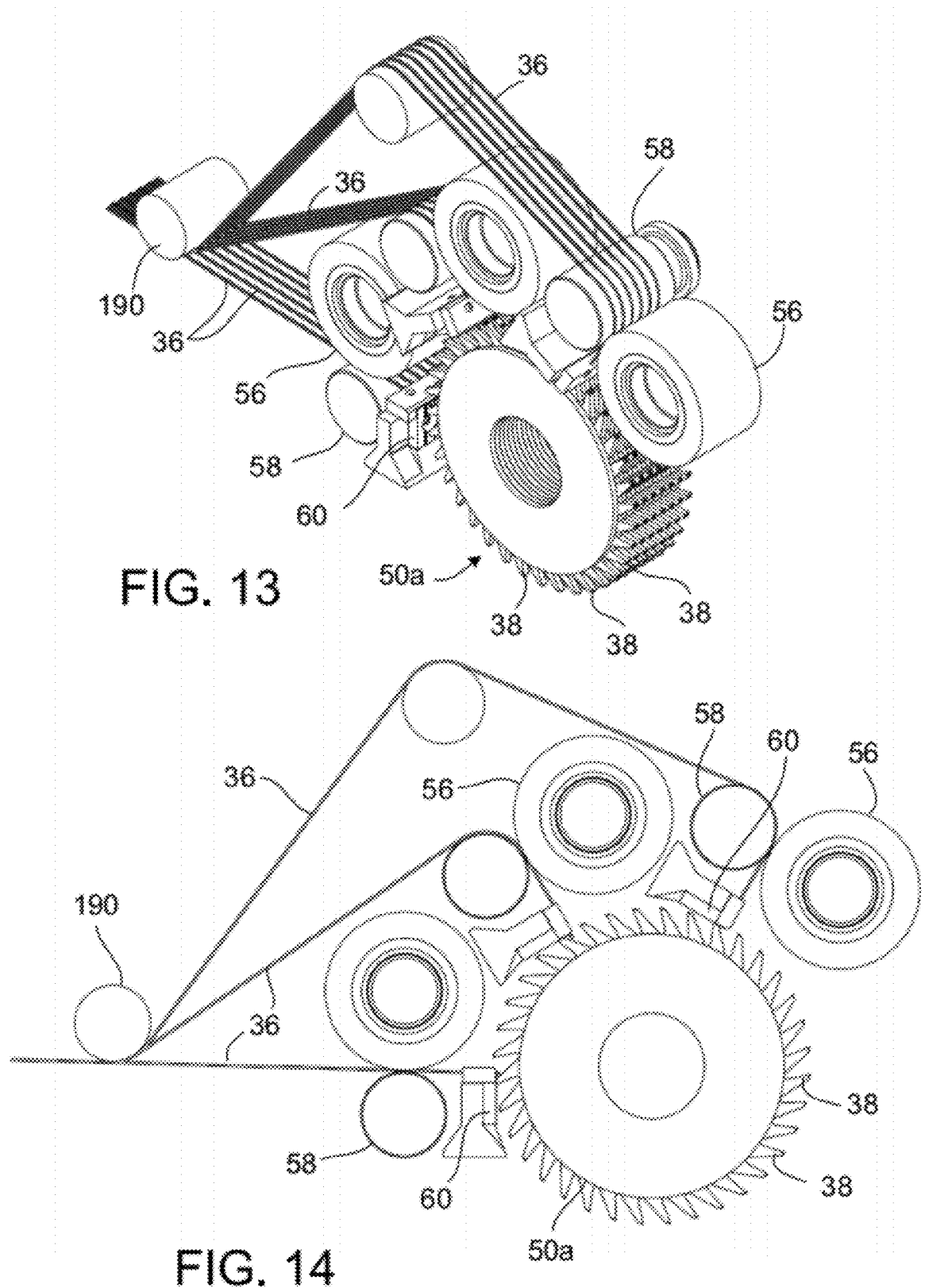
FIGS. 13 and 14 illustrate a rail cutting machine in which multiple rails are fed to a single cutter wheel.

Although the machine of FIG. 8 is illustrated as configured to process only a single extruded rail at a time, other machine examples are configured for processing multiple rails. For example, FIGS. 13 and 14 illustrate a configuration for feeding multiple banks of rails 36, spaced apart along the circular path of the cutters, to a wheel 50a, such that each cutter 38 cuts through multiple rails in each revolution of the wheel. In this example there are three banks of rails, each bank corresponding to a separate bed knife 60 and drive wheels 56 and 58. The banks are separated from one another after passing over an idler 190. As illustrated, each bank of rails consists of multiple rails 36 fed in parallel through corresponding bed knife grooves, to corresponding cutters 38 aligned with the bed knife grooves and mounted on a single cutter wheel 50a that is formed as a compressed stack of concentric cutting plates, each plate carrying a respective series of cutters 38 that are spaced from the cutters of adjacent cutting plates so as to be aligned with the grooves of the bed knives 60. The cutting plates may be held in alignment about a mandrel (not shown), and spaced apart with shims for proper axial spacing. Although not shown in this illustration, the rails are supported in respective transfer tubes between the drive wheels and bed knives, as discussed above with respect to FIG. 10.

With more densely configured cutting processes, it can be useful to supply a strong flow of air, such as in a direction coinciding with the axis of the cutting wheel, to blow the severed bits away from the cutting wheel so as to not interfere with the cutting of other rails or to be further severed by other blades.

In such a manner the basic process illustrated in FIG. 8 may be multiplied within a single machine to greatly increase bit production. For example, operating at the same cutter wheel speed, diameter and tooth spacing, feeding three banks of 20 rails in each bank would produce almost 100,000 bps, or enough bits every minute to cover one square meter of a product at an average distribution of 10 bits per square centimeter (or a length of 200 meters of 30 centimeter wide tape every minute). Even higher production rates per machine may be achieved with more cutters about the wheel, higher wheel diameters, and more rails being engaged per wheel rotation. A single bit-cutting or pelletizing machine may be configured to process anywhere from 1-100 rails simultaneously, at cutter wheel speeds of anywhere from 500 to 4000 RPM, and from 4-120 cutters spaced around the circumference of the rotary cutter wheel, producing up to 800,000 bps, per machine.

After being severed, the bits may be collected in a bag or other container, such as through an exit chute into which the bits fall from the cutting wheel. In cases where some dust or other smaller particles are generated during pelletizing, such dust can be separated from the bits prior to packaging, such as by elutriation. Elutriation may also be employed to separate different bit shapes or sizes, in cases where the cutting wheel is configured to produce different bit configurations. Dissipation of static charges remaining on severed resin bits following pelletizing may be accelerated by moistening the rails prior to cutting, such as by spraying them with a fine water mist.

Figure 15:
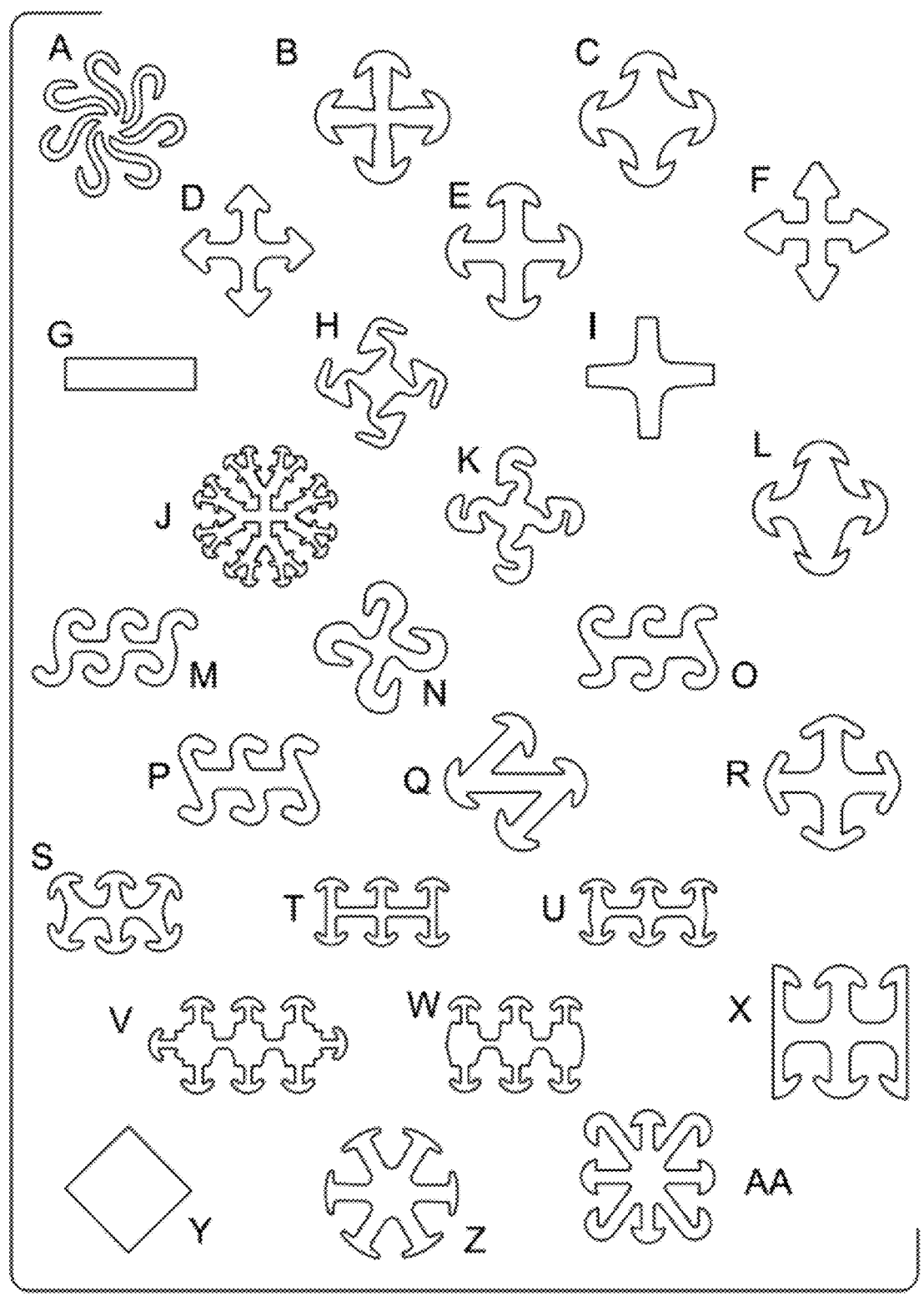
FIG. 15 shows 27 different rail cross-sectional shapes, from which bits may be cut, the shapes labeled A through AA.

FIG. 15 shows several examples of cross-sections that may be continuously extruded to form rails from which bits may be severed. Each cross-section shown in FIG. 15 represents a constant rail cross-section, with the outline of the profile representing the surfaces that extend continuously along the length of the rail and maintain their as-extruded nature in the severed bits. Many shapes, like those labeled B-F, H, K, L, N and R, have four projections, each extending from a common hub generally perpendicular to two adjacent projections. In many of those, the projections are all identical. Shape L shows an example in which the projections are not all identical. Many, such as shapes B-F, I, L and R-Z, are symmetric about each of two axes (one vertical and the other horizontal as illustrated). Shape L, for example, is stiffer with respect to compression in the vertical direction, so as to withstand cutter load without buckling. Some, such as shapes M, O, P and S-W, have both a major axis and a minor axis perpendicular to their longitudinal axis, with the cross-section longest along its major axis. With such shapes it is preferred that the cutting occur along the direction of their minor axis. Many of the shapes with major and minor axes of different dimensions have projection extending in only two opposite directions, such as in shapes M, O, P, T, U and W. Shapes S and Z each have six projections, each extending in a different direction, and shape AA has eight projections each extending in a different direction. Shape V is similar to shape W, but with the addition of projections extending from either end along the major axis. Shape J has four primary projection groups, each group comprising several branches that form discrete projections, such that the outer periphery of the bit has 16 separate heads. Many of the shapes have projections with heads that overhang their stems on both sides of the projection, such as those in shapes B-F, H, J-L, Q-W and Z, and some of the projections of shapes X and AA. Other projections, such as those of shapes A, G and M-P, and some of those of shapes X and AA, have heads that overhang on only one side of their stem. In some shapes, such as shapes H and K, the projections each overhang in two directions, but at different distances along the projection. In shape Z the heads overhang both sides of the projection stems to form crooks, but with no return of the tips of the head toward the hub of the bit, such that the underside surfaces of the heads are essentially flat and perpendicular to the adjacent projection stems surfaces. In shape Q projections extend at acute angles up and down from a central web (shown horizontal in the figure), the ends of which are also equipped with overhanging heads, such that the overall cross-section of the rail has the general appearance of a letter 'N' or 'Z'. This shape also provides for some vertical collapse during cutting, the upper and lower arms of the shape elastically compressing against the central web to support the arms during cutting. In most of the illustrated shapes the outer surfaces of the projection heads are rounded, while the heads of shapes D and F are generally pointed.

Some non-circular shapes, such as shapes G, I and Y, do not have crook-defining projections, or projections with overhanging heads. Shape G is a simple rectangle that may be said to have no projections per se, while the projections of shape I have no overhanging heads. Shape Y is a simple diamond, or a canted square, oriented so as to be cut along a path extending between two opposite points of the diamond. Of course, many other rail shapes, and corresponding bit shapes, are useful.

Figure 16A:
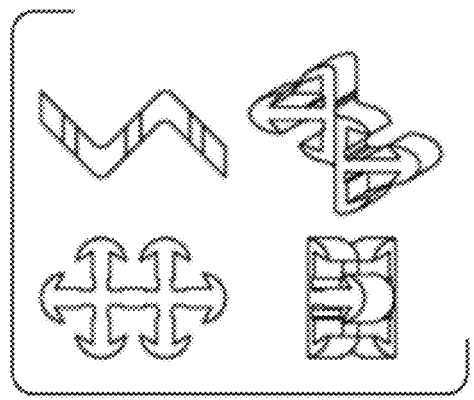
FIGS. 16A-16F show six different bit structures, each structure illustrated in one perspective and three orthogonal views.
Figure 16B:
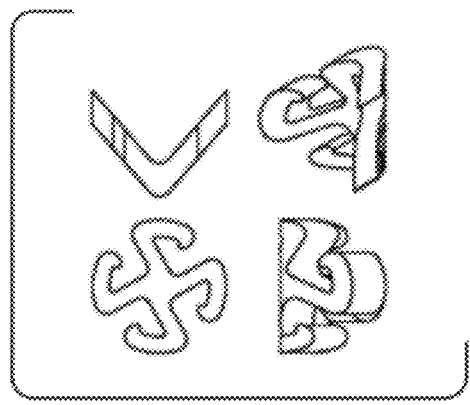
Figure 16C:
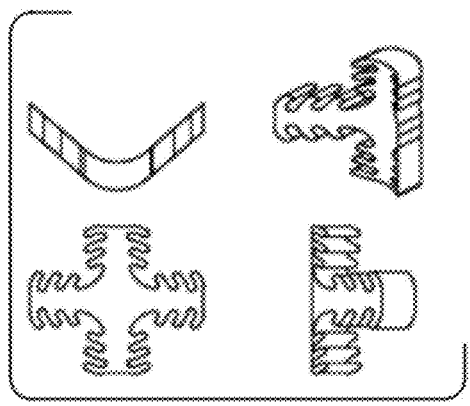
Figure 16D:
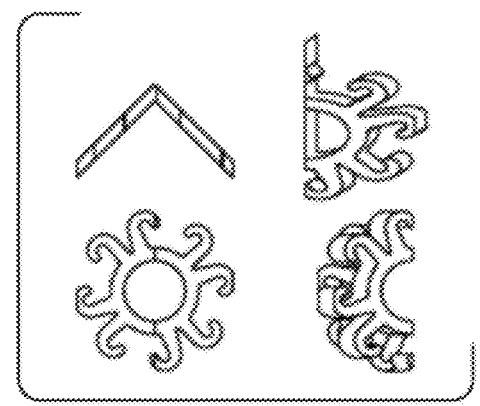
Figure 16E:
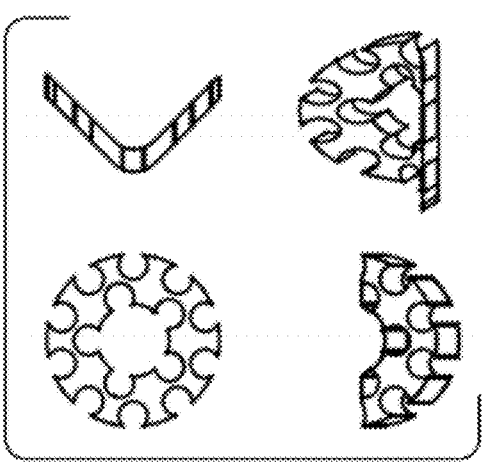
Figure 16F:
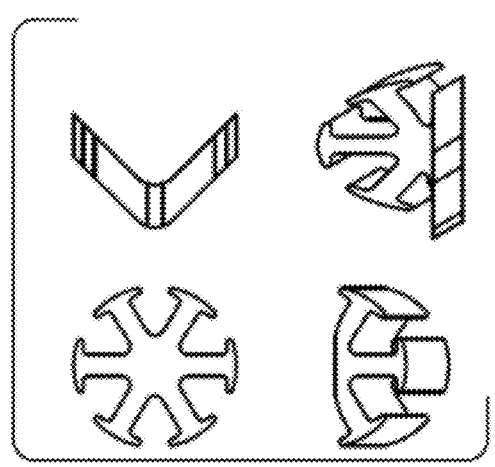

Rails of the various cross-sections discussed above can be cut with various cutter profiles to create non-planar bits of different configurations. FIGS. 16A-F illustrate six such structures. The bits of FIGS. 16B-F have all been cut with a cutter having a single bend or apex aligned with the centerline of the rail, such that in top view (shown in the upper left quadrant of each figure) the bit has a V-shape. The apex of the cutter may be sharp, resulting in little radius at the apex of the bit, such as in the bit of FIG. 16D, moderately radiused, as to produce the bits of FIGS. 16B, 16E and 16F, or more broadly radiused, as to produce the bit of FIG. 16C. The bit of 16A was produced by severing a rail (of cross-section essentially as shown in the lower left quadrant of FIG. 16A) with a cutter defining two interior bends or corners, such that the resulting bit has the wavy profile shown in the top view of the upper left quadrant of the figure. The bits of FIGS. 16A-E are severed from rails of different cross-section than those shown in FIG. 15, while the bit of FIG. 16F was severed from a rail having the cross-section according to shape Z of FIG. 15. The bit of FIG. 16E is cut from a hollow rail, the inner surface of the rail shaped to form projections extending inward from the body of the bit, while the outer surface of the rail is shaped to form projections extending outward from the body of the bit. It will be understood that each of the bits of FIGS. 16A-F will tend to self-orient, when falling on a horizontal surface, with at least one of its projections raised from the horizontal surface, and in many cases extending away from such surface. These are but examples of bit configurations useful for forming various products. The rail shapes shown in FIG. 15 (and in the lower left quadrants of each of FIGS. 16A-F) may be cut with any of the cutting profiles shown in FIGS. 3A-3D, or discernable from the bit structures of FIGS. 16A-F, or otherwise non-planar) to create significantly more examples of bit structures than can be readily discussed or illustrated here.

If the bits are to be used in applications requiring that they have projections raised from a surface, then radial orientation of cutting profile to rail cross-section is important for some combinations of cutting profiles and rail cross-sections. For example, if one were to form the bit of FIG. 16B, but with the rail rotated 45 degrees, such that the apex of the cut passed between adjacent projections, the resulting bit would have a stable orientation resting on a horizontal surface supported on its four heads, with the concave side down. This illustrates a more general concept for such applications that, for a cutting profile having but one apex, the bit should be cut such that its heads are not all equidistant from the cutting profile apex. Thus, when cutting a cross-shaped rail, for example, the rail is preferably oriented as shown in FIGS. 6A-6C, with two of its projections aligned with the direction of cut. However, some rail cross-sections are not as particularly orientation-dependent, even for such applications. For example, the axisymmetric cross-sections of the rails severed to produce the bits of FIGS. 16E and 16F need not be constrained to a particular radial orientation during cutting in order to produce a particular bit geometry, and can be supported in a simple round groove. Rails having a major and minor axis, such as the rail from which the bit of FIG. 16A is cut, are preferably cut in the direction of their minor axis.

Figure 17:
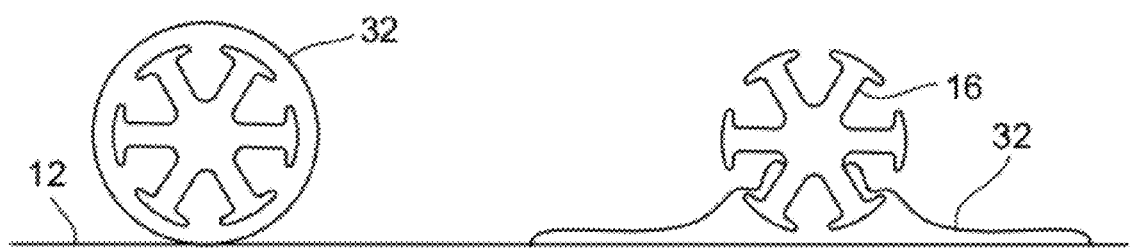
FIG. 17 illustrates fixing a bit by an adhesive bit coating.

The rail may be encased in an adhesive material that is severed during pelletizing, such that each severed bit is encased in a portion of adhesive material. Referring to FIG. 17, the bit on the left side of the figure is shown encased in an adhesive 32 that may also serve as a projection stabilization material during cutting (as discussed above with respect to FIG. 7). After the encased bits are distributed onto surface 12, adhesive 32 is made to flow from the bit onto the surface, as shown in the right side of the figure, to expose at least some of the projections 16 and to fix the bit to surface 12.

Figure 18:
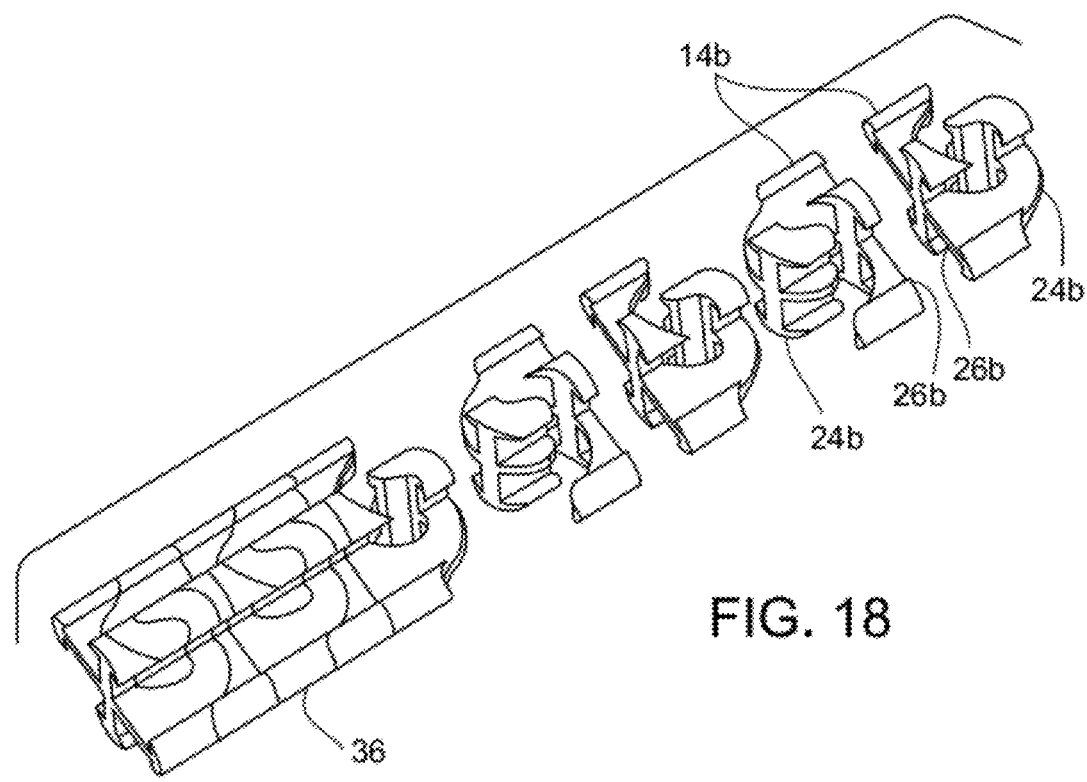
FIG. 18 is an exploded view, illustrating severing of bits with a flat side and a profiled side, from a single rail.

The bits shown in the above figures each have two non-planar severed surfaces. FIG. 18 shows how bits 14b can be severed from a simple cross-shaped rail 36, but such that each bit 14b has a non-planar severed side surface 24b and a planar severed side surface 26b. The pattern of cuts for making this series of bit shapes is shown on the unsevered portion of rail 36, and the non-planar severed surfaces 24b of adjacent severed bits, which overlap themselves along the longitudinal axis of the rail, are shown spaced apart for illustration purposes. This cut pattern can be made, for example, with a cutting wheel having alternating non-planar and planar cutter profiles, and results in no inter-bit scrap segments to be removed from the severed bits.

Figure 19:
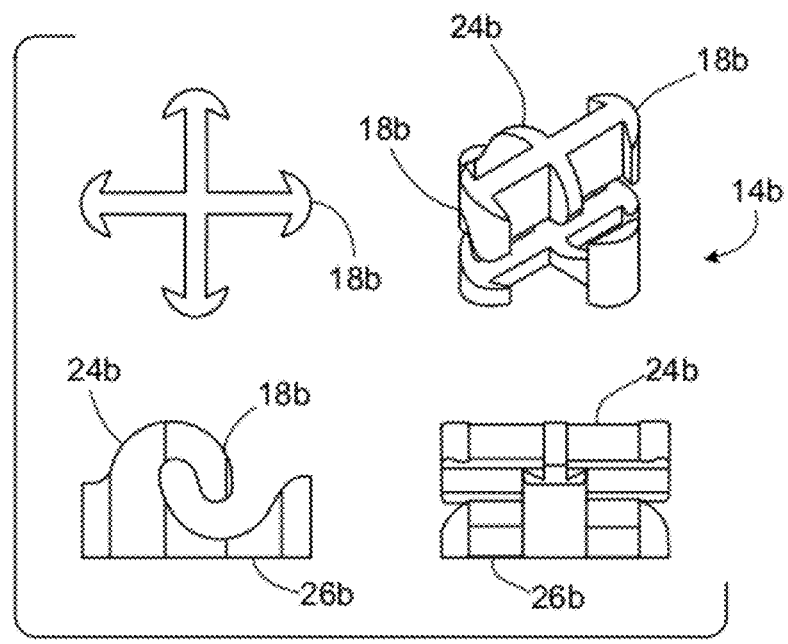
FIG. 19 shows one of the bits produced as in FIG. 18, illustrated in one perspective and three orthogonal views.

As shown in FIG. 19, even if bit 14b lands on its planar severed side 26b (i.e., in the orientation illustrated in the lower left quadrant of the figure), the non-planar severed side 24b will produced by this cutting pattern will provide at least one elevated head 18b.

Pelletized bits may be fixed to a surface by an adhesive material. One example of a suitable liquid adhesive 32 is V-Block™ Primer/Sealer, available from APAC in Dalton, Ga. (www.apacadhesives.com), a solvent-free, polymer based adhesive that may be applied to a surface prior to bit distribution, using a napped paint roller, a brush or even by spray coating. Such an adhesive may also provide moisture barrier properties in the final product, if applied as a solid coating. Other adhesives include KOESTER VAP 1® pH Waterproofing System, an epoxy-based waterproofing sealer available from Koester American Corporation of Virginia Beach, Va. (www.koesterusa.com), as well as acrylic laminating adhesives, and Wet-Look Sealer No. 985, an acrylic-based masonry sealer available from Behr Process Corporation. Even white school glue, such as that sold by Elmer's Products Inc. of Columbus, Ohio (www.elmers.com), has been successfully employed to fix bits to surfaces, such as by first diluting the glue with water and then allowing for evaporation after bit distribution. Other useful adhesives include paint and epoxy coatings, for example.

The bits described above may be cut from rails formed of extruded polymeric resin containing a thermoplastic, such as polyurethane. An example of a useful thermoplastic polyurethane (TPU) from which the bits may be fashioned is Carbothane® 3555D B-20, an aliphatic polycarbonate-based urethane with a 20% barium sulfate loading, manufactured by Lubrizol Advanced Materials, Inc. of Wickliffe, Ohio (www.lubrizol.com). This particular material is considered a "dead" urethane, meaning it has a high degree of energy absorption and a large tan(delta), which may help contribute to clean cuts through the rails at high speeds. The barium sulfate filler is also believed to increase the deadness of the material and reduce smearing during cutting. TPU's of even higher flex modulus may be of some value as rail materials. Polyester and co-polyester exhibit the potential to cut cleanly at high cutting speeds, although perhaps by a different cleavage mechanism than TPU. Film-grade co-polyesters are also of some interest, particularly for cutting at elevated resin temperatures, such as at around 95 degrees Celsius.

As discussed above, the severed bits are dimensionally stable and can be stored and transported as a bulk material.

Figure 20:
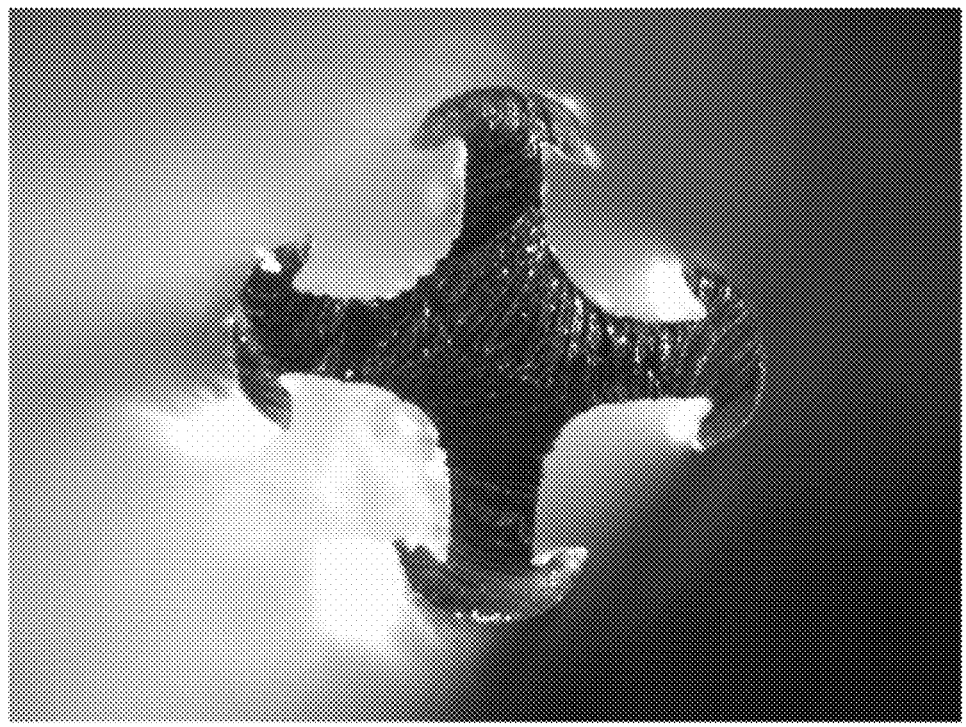
FIGS. 20 and 21 are enlarged photographs of severed surfaces.
Figure 21:
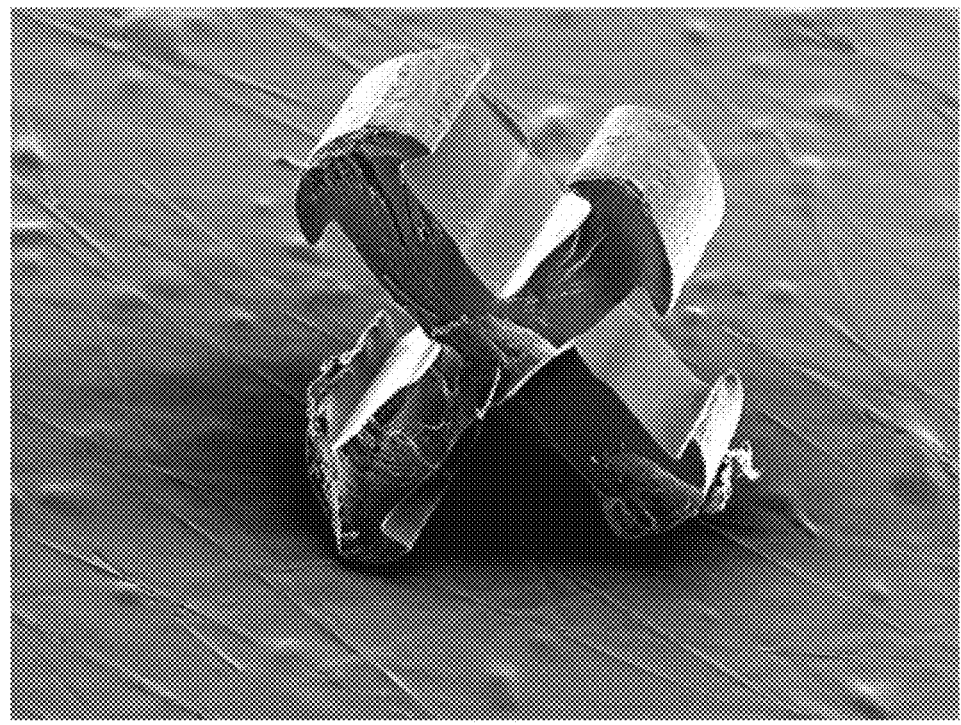

Referring next to FIGS. 20 and 21, the temperature of the rail material during cutting, and the speed of the cutting, can impact the cut 'quality' or the characteristics of the severed surfaces of the bits. For example, it has been found that when cutting thermoplastic urethane resins, a more preferred cut quality is obtained by cutting at a temperature well above the glass transition temperature of the resin. When cutting at temperatures below or closer to the resin glass transition temperature, more significant smearing of the severed surface was observed. The same phenomenon has been observed with other non-cross-linked, amorphous polymers. The photograph of FIG. 20 is of polyester rail cut at a temperature about 23 degrees C. above its glass transition temperature, appearing to show a brittle fracture propagation that did not propagate faster than the speed of the cutter (in this case, a blade of a pair of scissors). The PET bit shown in FIG. 21 was cut from a rail that had been crystallized by heat treatment, and indicates a brittle fracture after much less elastic deformation, in which the fracture line appears to have out-paced the cutter (akin to shattering). The resulting bit shown in FIG. 21 exhibits a lower cut quality and may indicate a cutting process that is less repeatable and controllable.

On the other hand, severing resins at temperatures well below their glass transition temperatures appears to produce a ductile fracture, with significant localized and overall plastic deformation occurring before or during fracturing.

Various of the bit designs illustrated in the drawings will have different tendencies to engage other bits in a bulk volume, or clump together. Such bit clumping can also be exacerbated by static electricity formed on the bit surfaces during cutting, but such charges tend to dissipate over time.

Figure 22:
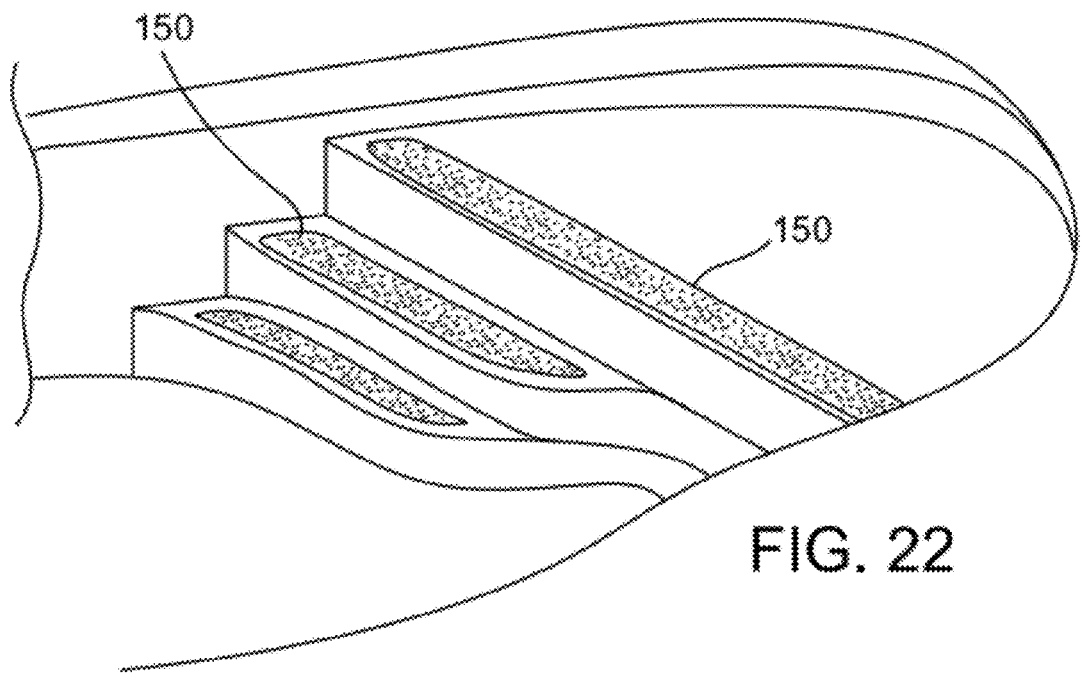
FIG. 22 shows steps with anti-skid surfaces incorporating pelletized bits.

Pelletized bits formed by the above-described machines and methods may have many applications. For example, FIG. 22 illustrates swimming pool steps to which a large number of pelletized bits have been adhered so as to create a non-skid surface in bounded regions 150. The nature of the pelletized bits provide good skid-resistance, particularly if configured with projections and non-planar opposite sides.

Figure 23:
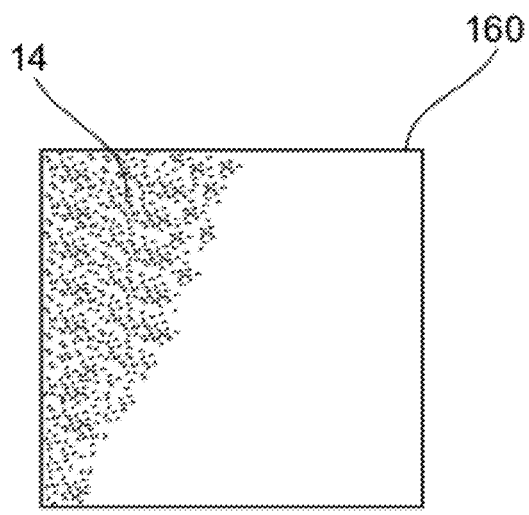
FIG. 23 shows a filter, or alternatively a cushion, filled with pelletized bits.

The pelletized bits may also be used in bulk quantity as a filter material, or as a soft filler material for pillows, blankets and the like. FIG. 23 shows a permeable filter housing 160 filled with a large quantity of loose bits 14, in contact with each other but otherwise surrounded by air. The bits, pelletized with non-linear cuts from intricately shaped rails as discussed herein, have a very low packing density and individually a high surface area to volume ratio. In bulk, they can be effective at filtering liquid flows, or even larger particulates from gas flows. To further enhance filtering, they may be pelletized from rails of material having an affinity for a given contaminant, or from rails coated with a material that attracts or clings to a particular contaminant to be filtered from a flow through the filter.

In another example, the outline 160 of FIG. 23 may also be said to represent a flexible container filled with loose bits 14 to form a resilient cushion, the resiliency and weight-bearing attributes of the cushion provided primarily by or through the bulk quantity of contained bits.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of pelletizing a length of material to form discrete bits of material, the method comprising
   feeding a longitudinally continuous length of material through a guide aperture;
   supporting a distal region of the continuous length of material against a support surface defining an edge beyond which a distal end of the continuous length of material is fed downstream of the guide aperture; and, while continuing to feed the continuous length of material through the guide aperture and over the edge of the support surface,
   severing the continuous length of material at or beyond the distal edge at discrete intervals by a series of cutters disposed at spaced intervals about a cutting wheel, to form discrete and separate bits of the material,
   wherein the continuous length of material is of non-circular cross-section, the cutting wheel is maintained in alignment with the guide aperture, and the cutters are shaped such that severing the continuous length of material forms cut surfaces that have
      perimeters of non-circular axial projection; and
      non-planar cut profiles perpendicular to a direction in which the cutter moves through the continuous length of material, wherein the edge of the support surface is shaped in accordance with the cut profile, such that each cutter passes through a recess at the edge of the support surface after severing the material.

2. The method of claim 1, further comprising maintaining a rotational orientation of the continuous non-circular cross-section of the length of material within the aperture.

3. The method of claim 2, wherein the guide aperture is at least partially defined by the support surface, the support surface defining a channel that is shaped to maintain a rotational orientation of the supported distal region of the continuous length of material during severing by the cutters.

4. The method of claim 1, wherein the cutters and the support surface recess are of complementary shape.

5. The method of claim 1, wherein the cutters are all of identical shape, such that the formed bits all share a similar cut end shape.

6. The method of claim 1, wherein the guide aperture is at least partially defined by the support surface.

7. The method of claim 1, wherein severing the material is performed while the material is compressed in a direction of cutting, such that in an uncompressed state in the severed bits opposite end surfaces are of different shape than as cut.

8. The method of claim 1, wherein the cutters each have a cutting profile that overlaps itself along a longitudinal axis of the continuous length of material.

9. The method of claim 1, wherein the continuous length of material is encapsulated within a stabilization layer that is severed as the material is severed.

10. The method of claim 1, wherein feeding the continuous length of material comprises passing the continuous length of material through a nip between two feed rolls, at least one of which feed rolls being driven to feed the continuous length of material.

11. The method of claim 10, wherein the guide aperture extends downstream of the nip to the edge of the support surface, the guide aperture defining an inner dimension less than twice a corresponding outer dimension of the continuous length of material, thereby limiting buckling of the fed length of material.

12. The method of claim 10, wherein the guide aperture is at least partially defined within a transfer tube that has an entrance positioned such that there remains at any point of time during the feeding and severing of the continuous length of material an unsupported portion of the continuous length of material between the feed rolls and the transfer tube that is of a length less than twice a maximum lateral dimension of the continuous length of material.

13. The method of claim 1, further comprising lubricating an outer surface of the continuous length of material upstream of severing the length of material.

14. The method of claim 1, wherein the continuous length of material has a maximum lateral extent of less than about 3.0 millimeters.

15. The method of claim 1, wherein multiple lengths of material are fed, supported and severed in parallel.

16. The method of claim 15, wherein the multiple lengths of material are fed in multiple banks that are severed at different positions about the cutting wheel.

* * * * *

UNITED STATES PATENT AND TRADEMARK OFFICE
CERTIFICATE OF CORRECTION

PATENT NO. : 8,940,207 B2
APPLICATION NO. : 13/197341
DATED : January 27, 2015
INVENTOR(S) : Peter J. Mueller et al.

It is certified that error appears in the above-identified patent and that said Letters Patent is hereby corrected as shown below:

In the Claims

Column 14, Claim 2, line 6, after "orientation of the" delete "continuous" and after "cross-section of the" insert --continuous--.

Signed and Sealed this
Twenty-sixth Day of May, 2015

Michelle K. Lee
*Director of the United States Patent and Trademark Office*